Figure 1:
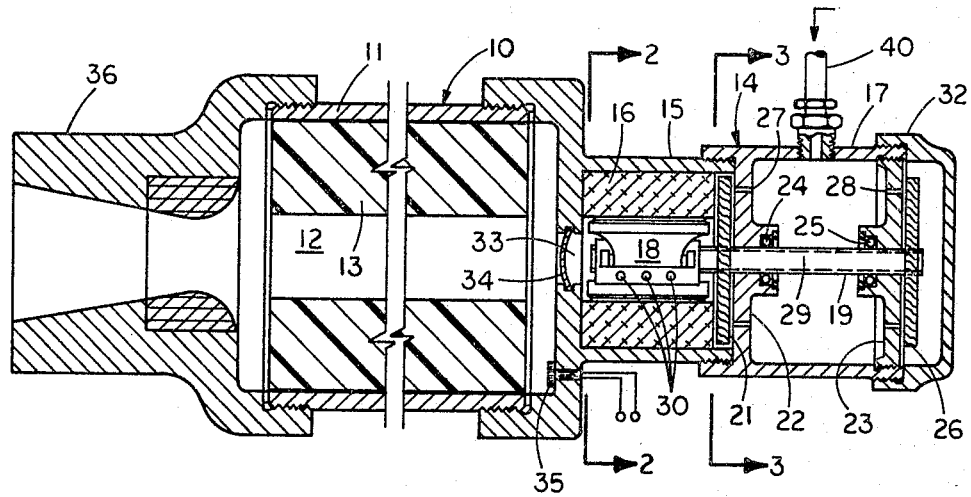

July 4, 1967     A. E. WILLIAMS ET AL     3,328,964
HIGH ENERGY ADDITIVE ADDITION MEANS TO A ROCKET MOTOR
Original Filed Oct. 23, 1964     3 Sheets-Sheet 1

INVENTORS
ALLAN E. WILLIAMS
LESLIE M. DYSON
LOWELL F. MATTHIES
by Thomas W. Brennan

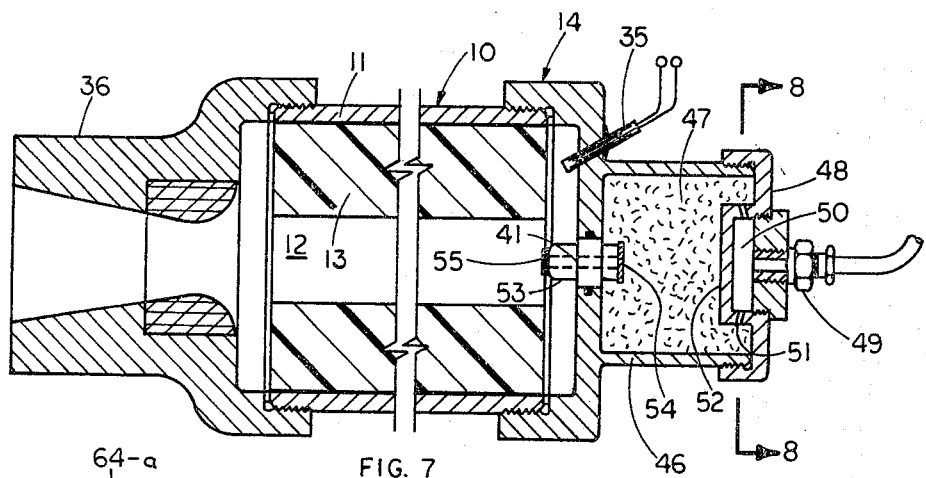
FIG. 7
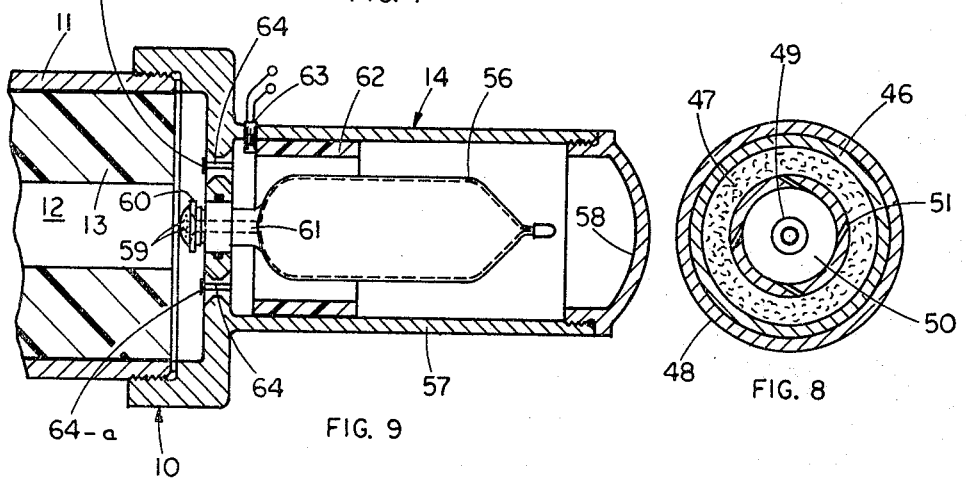
FIG. 9
FIG. 8
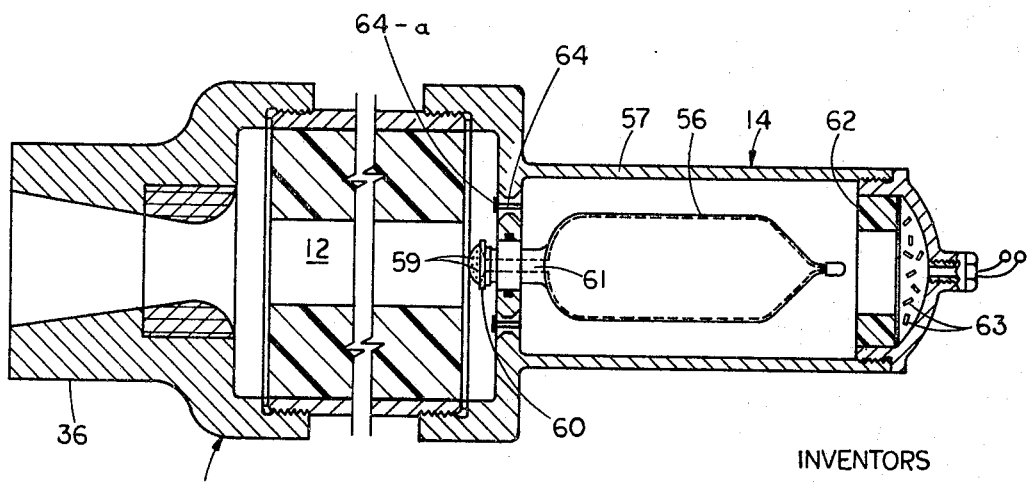
FIG. 10
INVENTORS
ALLAN E. WILLIAMS
LESLIE M. DYSON
LOWELL F. MATTHIES
by Thomas W. Brennan

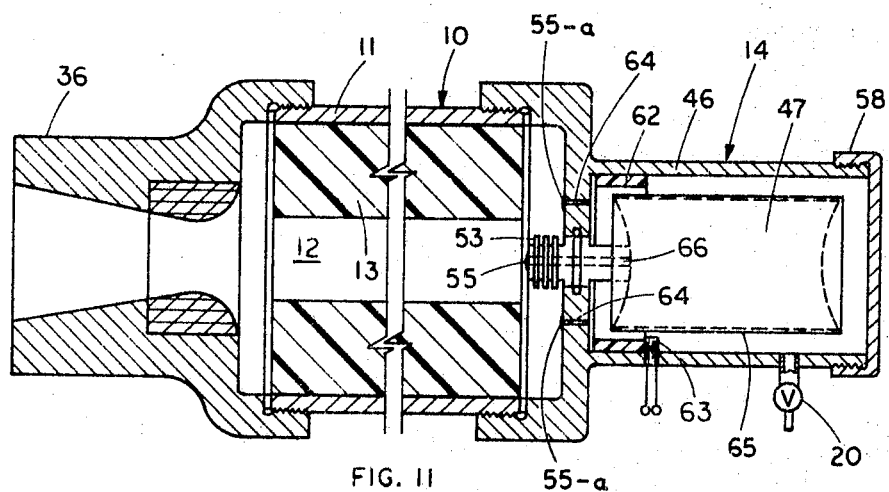

Patented July 4, 1967

3,328,964
HIGH ENERGY ADDITIVE ADDITION MEANS TO A ROCKET MOTOR
Allan E. Williams and Leslie M. Dyson, Elkton, Md., and Lowell F. Matthies, Washington's Crossing, Pa., assignors to Thiokol Chemical Corporation, Bristol, Pa., a corporation of Delaware
Original application Oct. 23, 1964, Ser. No. 406,039. Divided and this application June 1, 1966, Ser. No. 554,398
2 Claims. (Cl. 60—253)

This invention relates to solid propellant rocket motors, and more particularly to solid propellant rocket motors wherein high energy additives are brought into contact with the propellant charge at time of initiation of operation or shortly thereafter, but are sealingly separated under all other, nonoperating conditions.

This application is a division of copending application Ser. No. 406,039, filed Oct. 23, 1964, of Allan E. Williams et al., and now Patent No. 3,296,801.

In one of its several aspects, additives of a composition suitable for combustion in the chamber of a rocket motor, preferably a solid propellant rocket motor, are supplied from hermetically sealed mechanical means after or during motor start up. In other aspects of the invention, these additives are supplied by chemical and/or combustion means. Still other aspects will be alluded to and described in the following specification which has for its most important object to provide a solid propellant charge containing rocket motor having a casing defining a combustion chamber, means for initiating combustion of the charge in the chamber, and an exhaust nozzle for rearwardly expelling the gaseous products of combustion of the propellant charge to produce a thrusting force wherein high energy producing, chemically active additives are introduced simultaneously with, or shortly after, initiation of combustion, thereby resulting in a safe, reliable, and storable high performance motor.

Another object of the invention is to provide a motor of the character described wherein mechanical means is incorporated to supply the additives which are thereafter transferred to the combustion zone of the motor.

Still another object of the invention is to provide a motor of the type referred to wherein the performance of the motor is enhanced by energy augmenting additives supplied in a fluid medium to the motor combustion chamber simutaneously or shortly after initiation of combustion therein.

A still further object of the invention is to provide a rocket motor of the type described wherein the performance enhancing additives are supplied in a slurry and/or paste which is pressure fed or extruded into the combustion chamber simutaneously, or shortly after, initiation of combustion therein.

An additional object of the invention is to provide a rocket motor of the character described wherein the performance enhancing additives are particulated materials embedded in a combustible material charge in an auxiliary casing mounted on the head end of the motor which is thereafter ignited, producing gas for ignition of the main propellant charge in the combustion chamber of the motor and which acts as a fluid carrier for the particulated materials.

Figure 2:
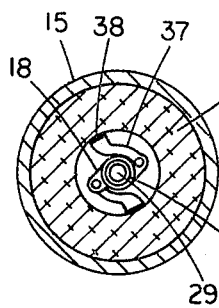
Figure 3:
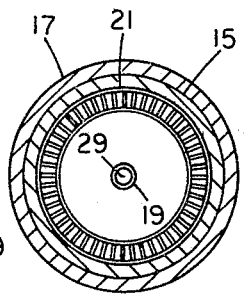
Figure 5:
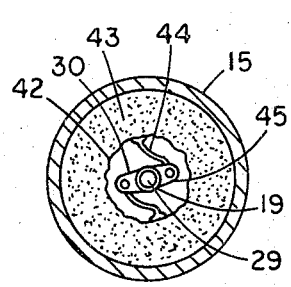
Figure 6:
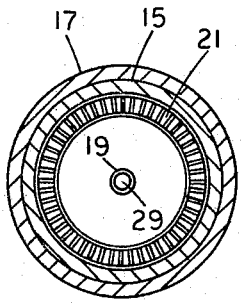
Figure 4:
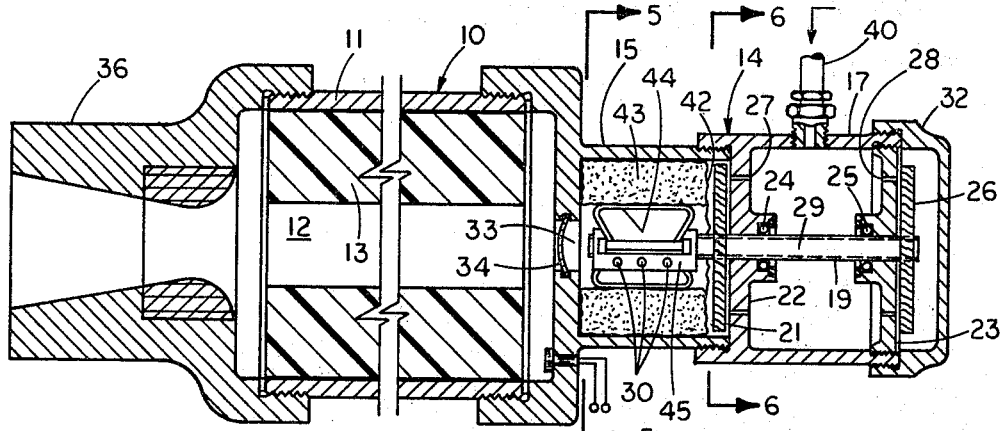

Other objects, features and advantages of the invention will be more fully apparent to those skilled in the art from the following detailed description taken in connection with the accompanying drawings in which like reference characters refer to like parts throughout and wherein:

FIGURE 1 is a sectional view of one embodiment of the invention illustrative of a mechanical means for supplying additives;
FIGURE 2 is a sectional view of the invention of FIGURE 1 taken on line 2—2 thereof;
FIGURE 3 is a sectional view of the invention of FIGURE 1 taken on line 3—3 thereof;
FIGURE 4 is a sectional view of another embodiment of the invention illustrative of an alternative form of mechanical means for supplying additives;
FIGURE 5 is a sectional view of the invention of FIGURE 4 taken on line 5—5 thereof;
FIGURE 6 is a sectional view of the invention of FIGURE 4 taken on line 6—6 thereof;
FIGURE 7 is a sectional view of still another embodiment of the invention illustrative of a fluidization means for supplying additives;
FIGURE 8 is a sectional view of the invention of FIGURE 7 taken on line 8—8 thereof;
FIGURE 9 is a partial sectional view of a further embodiment of the invention illustrative of a pressurization means for supplying additives;
FIGURE 10 is a sectional view of the embodiment of the invention illustrated in FIGURE 9 indicating an alternative pressurization means for supplying additives;
FIGURE 11 is a sectional view of a still further embodiment of the invention illustrative of still another fluidization means for supplying additives;
FIGURE 12 is a sectional view of an additional embodiment of the invention illustrative of a combustion means for supplying additives;
FIGURE 13 is a sectional view of an alternate form of the combustion means of FIGURE 12; and
FIGURE 14 is a sectional view of a second alternate form of the combustion means of FIGURE 12.

In its broadest aspects, the invention comprises a rocket motor of the solid propellant type wherein means is provided to permit operation at a higher performance level than heretofore possible, and wherein the means is in the form of consumable or combustible additives which are brought into contact with the main solid propellant at initiation of combustion or shortly thereafter. In the prior art, solid propellant ingredients, including additives are usually mixed or pre-mixed during the manufacture (of ingredients) or the loading phase of the motor casing, which after solidifying, results in the additives becoming embedded therein. Additives of various types, for example, the metals aluminum, zirconium, nickel, lithium, sodium, potassium, titanium, magnesium, beryllium, zinc, iron, manganese, vanadium, copper, chromium, hafnium, rubidium, cesium, calcium, strontium, barium and alloys thereof and the near metals or metalloids carbon, boron, tellurium, silicon, selenium, sulfur, phophorus, and the like are used as burning rate modifiers and/or catalysts and as primary fuels to enhance overall performance and specific impulse. Other materials such as hydrogen containing compounds and nitrogen are used as diluents to modify the temperature of the exhaust gases. Choice of additives, therefore, usually depends on their compatability with the propellant ingredients for safe handling and storage over long periods. And where the products of combustion become toxic (e.g., beryllium) because of the additives, use and creation of special facilities and/or safety precautions become mandatory. Other disadvantages are also encountered, for example, violent reactions due to exposure to certain types of environmental conditions, as high ambient temperature, subjection of the motor to sudden shocks during handling, etc. These disadvantages generally are outweighed by the superior performance obtainable from many additives, especially the metallic ones, but in the larger motors contemplated for use and presently in use today, these problems are becoming relatively insurmountable. Added thereto is the fact that present day motors use propellants which are quite energetic and contain highly reactive ingredients, especially oxidizers, and even in the solid state condition inside a rocket motor casing are not unknown to react during storage. In addition, many materials found most useful as additives are either themselves quite reactive or become reactive in conjunction with the oxidizer of the propellant. There results, therefore, a generally untenable situation wherein use of the motors within a very (relatively speaking) short time after manufacture is practically mandatory. If short time use is impractical, then it must be disposed of or otherwise destroyed as unsafe for storage. This, of course, results in needless expense and limits the usefulness of the motor.

This invention, however, obviates most of these problems by presenting methods and apparatuses for separating from the motor propellant until near the instant of use (i.e., at initiation of firing or shortly thereafter), these additive materials which are applicable to even the very large motors under safe and reliable operational conditions while remaining capable of demonstrably yielding the desired super performance sought after by present day rocket motor designers.

Referring now to the drawings, and in particular to FIGURE 1, there is shown a solid propellant rocket motor 10 comprising a cylindrical casing 11 defining a combustion chamber 12. Chamber 12 contains a solid propellant charge 13 which upon ignition, combusts to provide propellant or thrust producing gas upon expulsion from nozzle exit cone 36. Attached to motor 10 at the head end thereof is a particulated material supply assembly 14 comprising a pair of cylindrical, auxiliary casings 15 and 17 (shown in FIGURE 1 as threadably coupled for convenience). Attached, as by an adhesive bond or the like, to the interior walls of casing 15 is preferably a cylindrical, sintered body or plug 16 formed with a central cylindrical opening therein and prepared from any of the materials above referred to by any well known method or means. A solid, cast or machined block of metal or metalloid selected from one of the materials above listed is also within the purview of the invention. Disposed within the central opening of plug or body is a hinged grinder 18, mounted on a centrally positioned hollow shaft 19. Intermediately mounted on shaft 19 is a primary turbine wheel 21 housed within the casing 15. Shaft 19 is extendible into casing 17 interior and passes through partitions or bearing plates 22 and 23 being supported in bearings 24 and 25 therein respectively. A secondary thrust-load balancing turbine wheel 26 is mounted on the end of shaft 19 to the right of bearing plate 23. As will be hereinafter more fully explained, turbines 21 and 26 are mounted on shaft 19 in rotational engagement therewith and by incorporation of two such turbines effect cancellation of thrust loads on bearings 24 and 25. Bearing plates 22 and 23 which constitute partitions separating casings 15 and 17 interiors, also incorporate turbine nozzles 27 and 28 respectively. A fluid inlet fitting 40 is fitted in the outer wall of casing 17 for passage of fluid into the chamber defined by casing 17, and bearing plates or partitions 22 and 23. Shaft 19, as stated above, is hollow having a passageway 29 therethrough which communicates with a series of openings 30 in grinder 18. An end cap 32, threadably attached to the end of casing 17, completes particulated material supply assembly 14.

Separating chamber 12 and its propellant grain or charge 13 is an entrance port of injector orifice 33 which is provided with a separating hermetic seal such as rupturable diaphragm or burst disc 34 and establishes communication between casing 15 interior and chamber 12. An igniter 35 with electrical current supply leads for connection to an electrical source (not shown) is indicated in diagrammatic form and can be any of many devices utilizable for initiating combustion of grain 13. Exit cone or nozzle 36 is attached to the aft end of motor 10 to direct gases produced by the burning of propellant grain 13 in a thrust producing manner.

FIGURE 2 shows grinder 18 and its several parts in greater detail. As will be hereinafter explained, grinder 18, which can include a plurality of swivel arms 37 (only two shown for clarity), has grinders 38 on the end thereof contacting the inner surface of sintered body or plug 16 central opening. Arms 37 rotationally attached to shaft 19 by keying thereto or other well known, equivalent means (not shown). Arms 37 are held in contact against body 16 by centrifugal forces generated by rotation of shaft 19, although additional outwardly urging springs supplementary thereto can also be used and is contemplated for use herein.

In FIGURE 3, the primary turbine wheel 21 is shown in front elevation for clarity of detail and illustrates passageway 29 in shaft 19 more clearly.

In FIGURE 4, rocket motor 10 of the invention is shown with a modified particulated material supply assembly 14. Assembly 14 comprises a permeable, sieve-like container 42 of annular form and attached to the inner walls of casing 15. Permeable sieve 42 contains combustible, particulated or powdered additive materials 43, selected from the materials hereinbefore enumerated. In some uses a binder material is dispersed therein to give a solidified consistency capable of readily becoming powdered or reparticulated under certain conditions such as vibration. Sieve or permeable container 42 is capable of being flexed or vibrated without permanent deformation and has openings for passing particles sized smaller than about 10 microns. Contacting the inner, annular surface of sieve 42 is a vibrator or agitator arm 44 swiveled on rotating vibrator 45. Vibrator 45 is mounted on shaft 19 which is rotated by turbines 21 and 26 as in supply assembly 14 of motor 10 (FIGURE 1). Vibrator 45 has openings 30 communicating with passage 29 in hollow shaft 19.

FIGURE 5 shows vibrator 45 and swiveled arms 44 in more detail being an elevational view thereof, while FIGURE 6 shows a turbine 21 in elevation and shaft 19 in section for better clarity. Again in FIGURE 4 chamber 12 and the internal chamber defined by casing 15 is separated by a hermetic seal in the form of rupturable diaphragm or burst disc 34. Entrance port or injector 33 establishes communication therebetween. Igniter 35 with electrical supply leads for connection to an electrical source (not shown) is also indicated in FIGURE 4 for a purpose identical to motor 10 of FIGURE 1. In all other respects, including exit cone 36, end cap 32, charge 13, partitions 22 and 23, turbine 26 and fluid inlet fitting 40, the FIGURE 4 embodiment of motor 10 is identical to the FIGURE 1 motor 10.

FIGURES 7 and 8 are illustrative of a further embodiment of the invention wherein particulated material supply assembly 14 comprises a casing 46 defining a chamber filled with pre-particulated additive material 47. An end cap 48 containing a fitting 49, for introducing high pressure gas, is formed with an inner, U-shaped wall 52 to provide a plenum chamber 50 therewithin. Wall 52 has vortex gas injection ports 51 in the upright portions of the U-shaped wall 52.

Separating the interior of casing 46 and motor 10 chamber 12 is additive nozzle assembly 53 comprising an entrance screen 54, a hermetic blow out seal 55, and a passageway 41. Igniter 35 with electrical leads for connection to an electrical source (not shown) completes the invention as embodied and described in FIGURE 7.

FIGURES 9 and 10 together illustrate still another modification of the invention wherein particulated material supply assembly 14 comprises a collapsible tube or container 56 confined within head end mounted casing 57 and end cap 58. Container or tube 56 is pre-loaded with the particulated energy enhancing additive material selected from the above-referred to group thereof in a slurry or paste of a viscosity suitable for extrusion through ports 59 in nozzle 60. Communication between chamber 12 of motor 10 and the interior of container 56 is maintained through hermetically sealed ports 59 and passage 61 in nozzle 60. The gas generator 62 comprising a suitable propellant charge and igniter 63 therefor is confined in the aft end of chamber 57 (FIGURE 9) and in the head end of chamber 57 (FIGURE 10). Gas metering ports 64, with hermetic seals or fusible plugs 64–a are also provided for a purpose to be hereinafter explained. In FIGURE 10, gas generator 62 igniter 63 is provided in cap 58 as shown.

FIGURE 11 illustrates an additional modification of the invention as is similar in many respects to that of FIGURE 7. Particulating material supply assembly 14 in this form of the invention comprises a container 65 positioned interiorly of casing 46 containing additive material 47 dissolved or otherwise dispersed in a combustible and volatilizable liquid i.e., in a fluidized state. The space surrounding container 65 is substantially evacuated by means of a vacuum pump (not shown) connected to the valve means 20 shown. At the aft end of assembly 14 is an injection nozzle 53 comprising a hermetic seal, fusible plug or blow out diaphragm 55 and a passageway 66 providing communication between motor 10 chamber 12 interior and the interior of container 65. Metering ports 64 with hermetic seals 64–a provide communication between interior of casing 46 and chamber 12. Gas generator 62 and igniter 63 therefor provide a heat source for a purpose to be later indicated.

FIGURES 12, 13 and 14 are illustrative of further embodiments of the invention wherein motor 10 particulating material supply assembly 14 comprises a separate rocket motor 67 of miniature size. Motor 67 has its own rocket propellant charge 68, exit cone 69, and igniter 70 and is positioned in the motor 10 head end. In the FIGURE 12 form of the invention, auxiliary motor 67 is situated entirely within chamber 12 of motor 10 and has a hermetic seal in the form of a rupturable diaphragm or blow out disc 71 provided at the extreme end of exit cone 69. In this embodiment of the invention, additive 47, selected from the hereinbefore enumerated materials is contained by the propellant grain 68, which in turn, is selected for its low temperature burning qualities and its compatibility with the material 47 used. Additives 47 will be transported through exit cone 69 into combustion chamber 12 for energy augmenting purposes to be later described in connection with operation of this invention by combustion gases derived from auxiliary propellant grain 68.

In FIGURE 13, secondary or auxiliary motor 67 of particulated material supply assembly 14 has particulated, energy enhancing material 47 included in anxiliary grain 68 and is mounted exteriorly of motor 10 chamber 12 by means of a suitable fitting in the head thereof as shown. Hermetic seal such as rupturable blow out disc 71 is again fitted to the extreme end of exit cone 69 in the usual manner and igniter 70 is included as in FIGURE 12.

In FIGURE 14 of the invention, supply assembly 14, again comprising a secondary or auxiliary propellant charge 68 which contains the preselected additives 47 hereinbefore set forth, is bonded to the interior walls of casing 11 adjacent main propellant charge 13 of motor 10. Igniter 70 is again provided in the head end as previously described, and a foil-like hermetic seal or diaphragm 72, transversely positioned within casing 11, separates secondary propellant charge 68 from main charge 13 in chamber 12 of motor 10.

For operation of the invention, reference should be had to FIGURE 1, wherein is shown a generally preferred means for carrying out its objects, although under other operative conditions and uses, other modifications may preferably be utilized. In the FIGURE 1 embodiment gas, preferably combustible gas e.g., hydrogen and the like, is admitted through inlet fitting 40 to the interior of casing 17 between bearing plates or partitions 22 and 23, filling and pressurizing it. Gas passes through turbine nozzles 27 and 28 and over the blades of twin turbines 21 and 26 respectively imparting rotation thereto and by virtue of the incorporation of said twin turbines, injurious thrust loads on bearings 24 and 25 are effectively cancelled. Shaft 19 is rotated with turbines 21 and 26 about bearings 24 and 25 in bearing plates 22 and 23 thereby causing swiveled arms 37 on hinged grinder 18 to be forced outwardly toward inner surface 17 of body 16. Grinders 38 on swiveled arms 37, thereby contact this surface dislodging minute (5–10 microns) particles of the material from body 16. Gas discharged from turbine 21 passes around grinder 18 and is joined by that discharged from turbine 26 which enters passage 29 in shaft 19 and is ejected from openings 30 in grinder 18. This gas acts against disc 34, rupturing it, and entrains the material particles ground from plug 16 carrying them into combustion chamber 12 of motor 10. Upon entering chamber 12, the particles are combusted with previously ignited solid propellant charge 13. The particles derived from plug 16 by the grinding action of grinders 38 when combusted with charge 13, augment its energy producing capacity resulting in a significantly higher performing motor. The combustible hydrogen gas provides additional energy to create a further increase in motor 10 performance. In effect, motor 10 becomes a multifuel, solid propellant motor by a unique means in a heretofore unknown manner.

Similarly in FIGURE 4, combustible gas such as hydrogen or the like is introduced to the interior of casing 17 and is exhausted through nozzle ports 27 and 28 through twin thrust load cancelling turbines 21 and 26 as above described. Simultaneously, it enters passageway 29 of hollow shaft 19 which is rotatably engaged to agitator or vibrator 44. Agitator 44 rotates and vibrates permeable container 42 thereby dislodging particulated material 43 contained therein. Dislodged particles 43 pass through the openings in sieve 42 and are entrained in the fluid stream emanating from the ejector holes 30 in the base 45 of agitator 44 and from the exhaust of turbine 21. This fluid stream acts against disc 34 and ruptures it. Gas and entrained particles 43 then enter chamber 12 for combustion with previously ignited solid propellant charge 13 of rocket motor 10. The entrained particles in the combustible gas join in combustion with the burning propellant charge 13, thereby forming a high energy propelling gas which is exhausted through exit cone 36 to produce a higher performing rocket motor 10 as above described.

Operation of the invention of FIGURE 7 is similar except that the combustible gas such as hydrogen or the like is admitted to annular plenum chamber 50 through fitting 49. Igniter 35 is energized to initiate combustion of charge 13. Heat from burning charge 13 fuses or melts fusible plug 55. In the interim, gas from chamber 50 is injected through vortex passages 51 and fluidizes particulated material 47 in casing 46. These particles are thereafter carried into chamber 12 of rocket motor 10 through the now fully opened injection body 53. The size of particles 47 is preferably maintained below about 10 microns and screen 54 at the entrance of injector body 53 is utilized to insure this. Once in chamber 12, particles 47 are combusted with burning charge 12 and again a higher performing rocket motor is achieved.

Operation of the invention of FIGURES 9 and 10 (an alternative arrangement) is based upon pressurization supplied by the gaseous products derived from a solid propellant gas generator. Hence, particulating material supply assembly 14 casing 57 interior is pressurized by ignition of generator 62 by igniter 63. Part of the gas produced thereby passes into chamber 12 of motor 10 through metering ports 64 after melting hermetic seals for fusible port plugs 64–a and ignites propellant charge 13. The remainder of the gas pressurizes the interior of casing 54 and exerts a collapsing force on container 56 thereby forcing or extruding its slurried or paste-like contents, consisting of combustible energy augmenting particulated material into chamber 12 through passage 61 and extrusion ports 59 in extrusion nozzle 60. The material so extruded enters into combustion with burning charge 13 to create a higher performing rocket motor 10.

In operation of the invention as embodied in FIGURE 11, which in some respects is similar to that of FIGURE 7, the interior of casing 46 of particulated material supply assembly 14 is usually first evacuated by means of any well known, vacuum system or pumping arrangement (not shown) through the valve means 20 indicated. Igniter 35 is energized and gas generator 62 thereby ignited to produce gas at elevated temperature effectively becoming a heat source filling the evacuated space in casing 46 and entering metering ports 64 as in FIGURES 9 and 10. Hermetic seals or fusible port plugs 55–a at the end thereof are thus melted and the gas passes into chamber 12 to ignited propellant charge 13. Ignited propellant charge 13 produces propelling gas of high temperature and fuses plug 55 at the aft end of passage 66 in injector assembly 53. Passage 66 communicates with the interior of container 65 which contains particulated additive material 47 in a highly fluidized state or which is dispersed in a volatilizable and/or combustible liquid. Gas from generator 62 being at elevated temperature volatilizes the liquid in container 65 raising the pressure therein to force its contents into chamber 12 through passageway 66 in injector 53 where combustion thereof occurs with burning charge 13. There results or is produced thereby higher performing rocket motor 10 as hereinbefore set forth in the previously described embodiments.

Alternatively, the interior of casing 46 need not be evacuated although in most instances this is desirable for best operation. Casing 46 interior can also be precharged with a heat transferring gas, either ignitable or otherwise, which better effects heating of container 65 and volatilization of its liquid contents. In either or both usages, the skilled artisan will select the best mode, consistent with his own immediate requirements.

In the embodiments of the invention represented by FIGURES 12, 13 and 14, operation precedes as follows:

Igniter 70 is energized and solid propellant 68 in particulating material supply assembly 14 is fired to produce gas and pressure. Pressure of the gas destroys hermetic seal 71 (and hermetic diaphragm 72 in FIGURE 14) and the gas enters chamber 12 to ignite propellant charge 13 of motor 10. The propellant charges 68 in motors 10 of FIGURES 12, 13 and 14 have embedded therein particulated, energy augmenting material 47 previously selected which upon combustion will be transported by means of the gaseous products thereby to chamber 12 for complete combustion therein with charge 13. Thus, an improved, higher performing rocket motor 10 is again provided whereby all of the objectives herein set forth are readily achieved.

In addition to the invention in its several embodiments set forth herein what is additionally presented and described and sought to be protected by Letters Patent is a novel process for operating an improved solid propellant rocket motor of high energy output and performance which consists of providing a solid propellant charge in a casing, igniting said charge, supplying minute particles or ignitable metallic and/or metalloid material entrained in a fluid propellant to the ignited propellant for combustion therewith to obtain increased high temperature gases, and exhausting the combined gaseous products through an exit cone for production of thrust. In addition, the process includes the supplying of the energy augmenting particles from means contained within or integrated with the motor.

Other embodiments of the novel invention described herein and the method disclosed for carrying it out will occur to one skilled in the art to which it pertains after perusal hereof. Therefore, no undue limitations are to be placed upon it except in accordance with the scope of the subtended claims.

What is claimed is:

1. A high performance solid propellant rocket motor including a combustion chamber, an exit nozzle, a propellant ignition means, and a solid propellant charge in said combustion chamber, said high performance derived from combustible, particulated, energy imparting, additive material comprising, an additive supply means adaptable for attachment to the head end of said motor comprising a casing having a chamber for containing said energy imparting, additive material, means for producing fluid pressure in said casing for initially moving and thereafter transporting said particulated material from said casing to said rocket motor combustion chamber, and at least one connecting port for communication between said combustion chamber of said rocket motor and the interior of said casing chamber whereby said pressurized fluid transported particulated material passes to the interior of said rocket motor for combustion with said solid propellant charge in said main combustion chamber and wherein the additive supply means comprises an annular, permeable container for holding said additive in particulated form, agitator means for vibrating said container, and power means for rotating said agitator means whereby said particulated material is passed through said permeable container to the exterior thereof by said fluid.

2. The rocket motor of claim 1 wherein the power means is a turbine rotatively connected to said agitator means.

References Cited
UNITED STATES PATENTS

| | | | |
|---|---|---|---|
| 2,968,917 | 1/1961 | Whaley | 60—35.4 |
| 3,073,113 | 1/1963 | Faught | 60—39.47 X |
| 3,112,609 | 12/1963 | Bridgeforth | 60—35.4 |
| 3,122,429 | 2/1964 | Toulmin | 60—35.4 X |
| 3,158,997 | 12/1964 | Blackman et al. | 60—35.6 |
| 3,159,104 | 12/1964 | Hodgson | 102—98 |
| 3,173,252 | 3/1965 | Ziegenhagen | 60—35.6 |

CARLTON R. CROYLE, *Primary Examiner.*